April 21, 1970  E. M. BROCKWAY ETAL  3,507,597
LENS AXIAL ALIGNMENT METHOD AND APPARATUS
Filed Sept. 26, 1967

ELLSWORTH M. BROCKWAY
DONALD D. NORD
    INVENTORS

BY *Frank C. Parker*

ATTORNEY

United States Patent Office 3,507,597
Patented Apr. 21, 1970

3,507,597
LENS AXIAL ALIGNMENT METHOD AND APPARATUS
Ellsworth M. Brockway and Donald D. Nord, Rochester, N.Y., assignors to Bausch & Lomb Incorporated, Rochester, N.Y., a corporation of New York
Filed Sept. 26, 1967, Ser. No. 670,570
Int. Cl. G01b 9/02, 11/27
U.S. Cl. 356—110  2 Claims

ABSTRACT OF THE DISCLOSURE

A method and apparatus for interferometrically determining the alignment of the optical axis of a lens to be aligned with respect to a reference axis which is established by a light beam, the beam forming an interference fringe pattern concentric to the optical axis of the lens by the light wave fronts reflected from the two lens surfaces. When the lens is truly concentric and square with the reference axis, the fringe pattern and the reticle pattern are concentric with each other.

BACKGROUND OF THE INVENTION

It has long been realized that one of the principal requisites of a good optical system is that the optical axes of each lens element must be coincident with a common mechanical mounting axis. In the past, the alignment or centration of the optical axis of a lens element with respect to a common reference axis was usually determined by the use of an auto-collimator wherein each refractive lens surface of the element reflected back an image of the light source in such a manner that the relative lateral positions of such images indicated the degree of optical alignment. Such an apparatus is shown inter alia in Patent 1,309,359 to Kellner dated July 8, 1919 and 2,254,548 to Ruhle dated Sept. 2, 1941.

In other developments such as the Patent 3,324,766 to Miller dated June 13, 1964, auto collimation was discarded in favor of straight collimation and the auxiliary use of a centering electronic sensor and automatically controlled centering mechanism for the lens, said sensor being responsive to an unbalanced signal. Even interferometry has been tried to solve the problem as shown in the Michelson type of interferometer shown in Patent 1,565,533 to Twyman et al. dated Dec. 15, 1925 although this apparatus was intended to show lens surface contour aberrations.

SUMMARY OF THE INVENTION

There is herebelow disclosed a method and means for aligning a lens optical axis in coincidence with a single and/or common axis of reference, said method and means being effected by interferometry. Because of the general experience in the art that prior apparatus was not exact enough for the most modern manufacturing requirements, it is an object of the present invention to provide a novel method and apparatus for aligning a lens in coincidence with a single reference axis through the use of interferometry, said method and means being characterized by high precision in use and being adaptable to the most modern manufacturing methods.

It is another object of the present invention to provide such a device and method which is relatively simple in structure but nevertheless is reliable and stable in use.

Further objects and advantages will appear in the form, arrangement and combinations of parts by reference to the following specification taken in connection with the drawing.

DESCRIPTION OF PREFERRED EMBODIMENT

Figure 1:
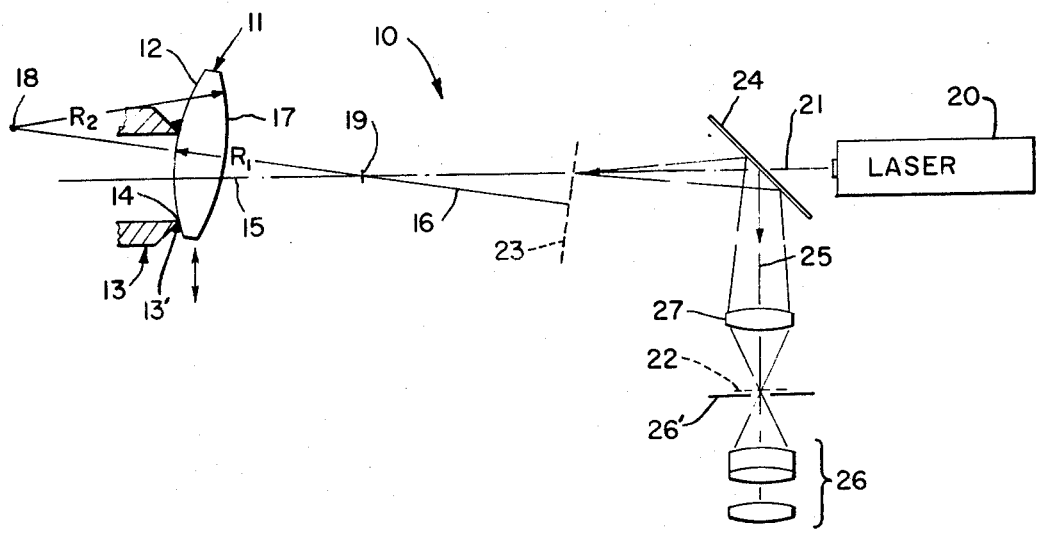
FIG. 1 is an optical diagram showing one form of the present invention is one condition of use.

The present invention is shown and described in only one of many possible forms and considerable latitude may be exercised in choosing the specific operating parts of the combination shown in FIGURE 1.

In the form of the invention shown in FIG. 1, the apparatus or combination generally is designated by the numeral 10 and it includes a lens 11 to be tested. The lens 11 is shown as a double convex lens having positive focal length although various other lenses having different optical forms, such as meniscus, double concave, etc., with two or more surfaces may be effectively aligned by the above mentioned method and apparatus as shown in FIG. 1.

One refractive surface 12 of lens 11 is seated against a lens seating member 13 having a circular portion or lip 14 which is here shown as a sharp edge whereon the lens 11 is secured by any preferred means such as chucking or cementing. At 13' is shown for instance a body of sticky cement which hardens after the lens alignment has been finished. Said lens seat 13 is centered on a reference axis 15 about which the lens seating member may rotate if desired. In any case, the means by which the lens 11 is secured on the edge 14 must allow for relative adjusting movements of the lens 11 so as to subsequently align the lens. The lens holding means per se form no part of this invention.

On every lens element whether spherical, cylindrical, or aspherical, there are two optical refractive surfaces. The optictl axis of this lens element is the line joining the centers of curvature and/or containing the axis of the aspheric surface. In the drawing, the optical axis is designated 16 and the free refractive surface of the lens 11 is designated 17. The radius of the lens surface 17 is designated $R_2$ and its center located at 18 along the lens optical axis 16. The radius of lens surface 12 is designated $R_1$ and the center of the radius is designated 19 and is located at the intersection of the common reference axis 15 with the optical axis 16.

Figure 2:
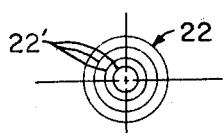
FIG. 2 is a diagrammatic showing of the reticle shown in FIG. 1.
Figure 3:
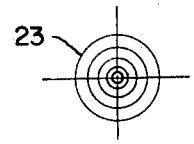
FIG. 3 is a diagrammatic showing of the interference fringe pattern formed in FIG. 1.

At a distance from lens 11 in alignment with the axis 15 is provided a laser type of light source 20 which projects a coherent and monochromatic beam 21 of light along the axis 15 and in fact actually is substituted for axis 16 when the apparatus is in use. It is not necessary that the light source be a laser, however, provided that the beam produced thereby is sufficiently strong and monochromatic. At a suitable focal plane located on an extension 25 of the reference axis 15 is located a comparison reticle 22 which is formed of any desired materials of concentric indicia elements 22' as shown in FIG. 2.

When the laser 20 is energized, the light beam 21 is projected through the successive lens surfaces 17 and 12 which reflect back light wave fronts which interfere with each other so as to produce an interference fringe pattern 23 along the optical axis 16. It will be observed that as the lens 11 is moved laterally in the direction of the doubleheaded arrow, the optical axis 16 will swing about the intersection point 19. When the lens 11 is properly aligned on the lens seat 13 with the laser 20 in operation, the interference fringe pattern 23 will be visible centered on the reference axis 15 or an extension thereof regardless of the geometrical and optical form of the lens 11, such as double convex, double concave, plano-convex, meniscus, etc.

For the purpose of viewing the reticle 22 and fringe pattern 23 together so that lateral movement of lens 11 will bring the reticle and the fringe pattern into superimposed positions in a field of view, an inclined beam divider 24 is located on axis 15 near the laser 20. The beam divider 24 reflects part of the returning beam laterally along an axis portion 25 whereon is located a relay lens 27, reticle 22 and eyepiece 26. In order to make the fringe pattern 23 visible in the eyepiece 26, a relay lens 27 is aligned on the axis portion 25 between the beam divider 24 and the reticle 22, said relay lens 27 being so located as to relay the fringe pattern 23 into the focal plane 26' of the eyepiece 26. Other means than the eyepiece 26 may be provided for detecting the desired condition of concentricity of reticle 22 and the fringe pattern 23 as dictated by the use for which said apparatus 10 is intended.

We claim:

1. A method for aligning the optical axis of at least one lens with a reference axis extending through the center of curvature of one of the lens surfaces, said method including the steps of;

providing a circular lens seat centered on said reference axis, securing said lens shiftably on said seat, directing a monochromatic collimated light beam from a light source through said lens along said reference axis to produce an interference concentric fringe pattern in space by the light wave fronts which are optically axially aligned with said reference axis, and positioning a comparison pattern in said beam and superimposing said interference pattern on said comparison pattern by moving the lens with respect to said reference axis until said fringe pattern is concentric with said comparison pattern.

2. A precision lens axial alignment apparatus for at least one lens comprising the combination of a highly coherent monochromatic light source which produces a well collimated beam of light, a circular lens seat on which said lens is held for alignment test, said seat being centered on said beam, the incidence of said beam on two of the lens surfaces producing a concentric interference pattern by the interaction of the wave fronts reflected therefrom which is centered on the optical axis of said lens, a comparison reticle having a concentric pattern formed thereon which is centered with said beam for optically aligning said lens, and means for indicating concentricity of the two patterns whereby the lens may be moved laterally of said seat to align its optical axis with the axis of said beam as evidenced by concentricity of the fringe pattern with the reticle pattern.

References Cited

UNITED STATES PATENTS 2,880,644   4/1959   Brockway et al. _____ 356—110

RONALD L. WIBERT, Primary Examiner

T. R. MOHR, Assistant Examiner

U.S. Cl. X.R.

356—124